United States Patent [19]

Wilkerson

[11] 4,058,903
[45] Nov. 22, 1977

[54] WHEEL BASE, TRACKING AND FRAME ANALYZER

[76] Inventor: Edward D. Wilkerson, P.O. Box 755 South Court, Normandy Beach, N.J. 08739

[21] Appl. No.: 649,473

[22] Filed: Jan. 15, 1976

[51] Int. Cl.² .................... G01B 5/255; G01B 11/275
[52] U.S. Cl. ............................... 33/288; 33/180 AT; 33/203.17
[58] Field of Search ........... 33/180 AT, 181 AT, 203, 33/203.15, 203.17, 203.20, 203.21, 288

[56] References Cited

U.S. PATENT DOCUMENTS 2,000,866   5/1935   Smith .................................... 33/288

FOREIGN PATENT DOCUMENTS

| 8,190 | 6/1928 | Australia | 33/203.21 |
| 738,405 | 10/1932 | France | 33/180 AT |
| 1,547,546 | 10/1968 | France | 33/288 |
| 303,308 | 1/1929 | United Kingdom | 33/203.21 |

*Primary Examiner*—Richard E. Aegerter
*Assistant Examiner*—Richard R. Stearns

[57] ABSTRACT

A wheel base, tracking and frame analyzer that has a pair of gauges each having a set of telescoping channels is disclosed. The two channels of each gauge carry reverse scales which overlap when the channels are extended the tread width of a set of wheels under test. Contact fingers are carried by each channel so that a wheel and tire will be squarely engaged. An optical sight tube is adjustably located on each gauge so that a target reading may be taken on the reverse scales of the second gauge. Similarly, the second gauge adjustably supports a sight tube which reads the reverse scales on the first gauge. In a second embodiment, a semi-circle protractor is substituted for each sight tube, and an elastic cord is extended between the origin points of both protractors. The ratios of the two reverse scale target readings, when each sight tube or each protractor origin point is located on a unity ratio position on its supporting gauge, renders an indication of the wheel base, tracking, or frame distortion. In particular, the type of such distortions, for example a diamond frame, an offset frame, slipped rear axle, or a crushed front corner, may be determined by an analysis of the target ratio readings.

12 Claims, 23 Drawing Figures

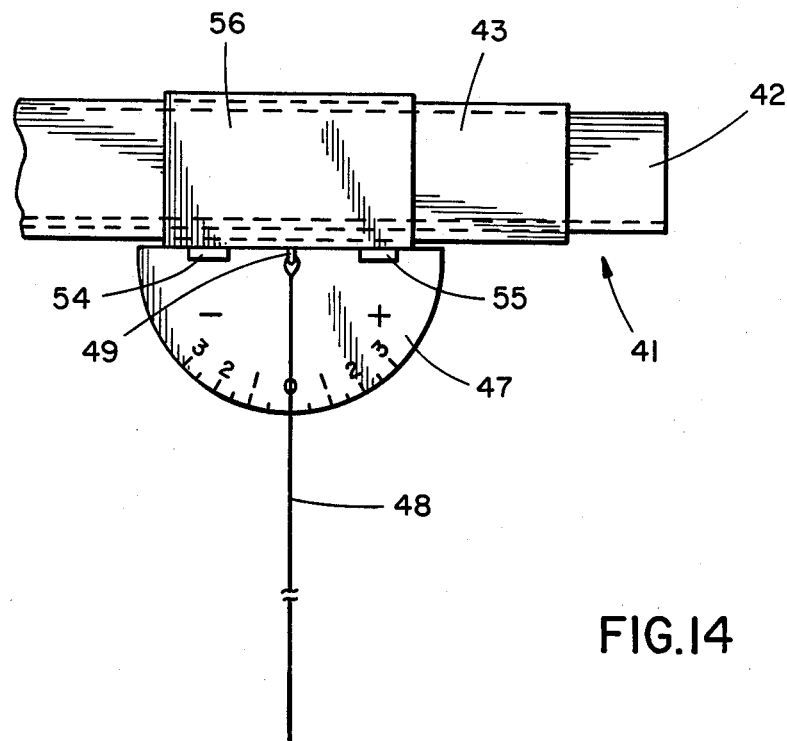
FIG.14
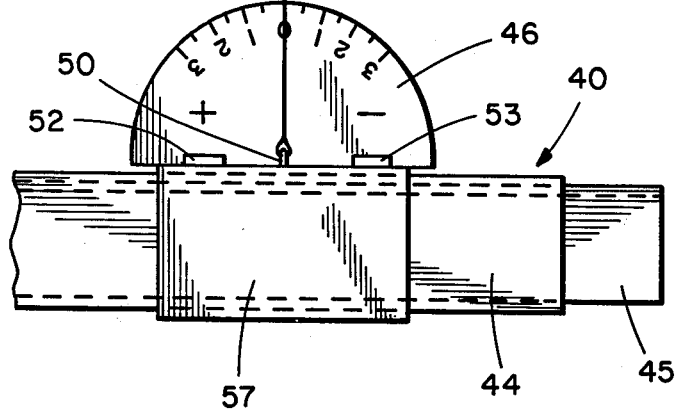
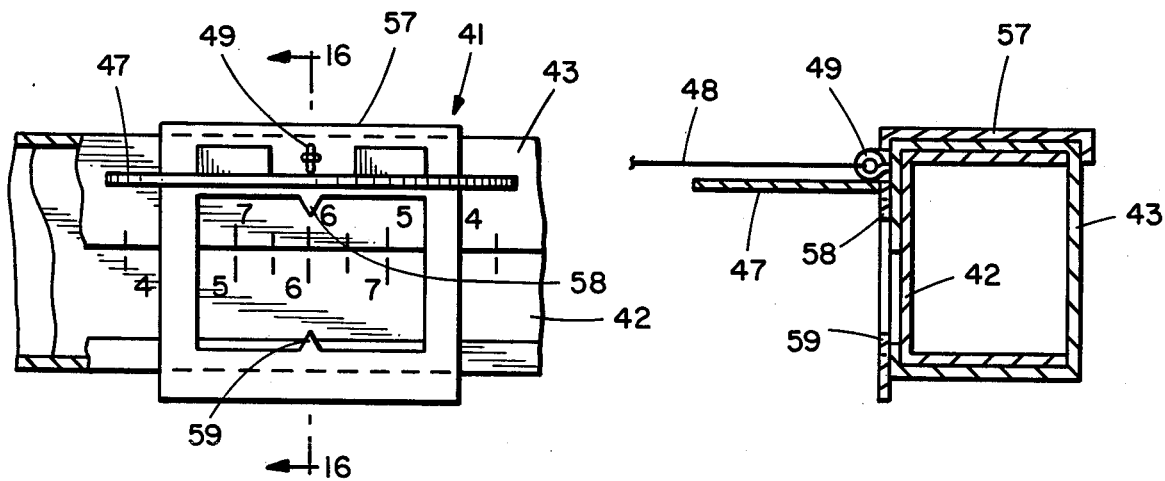
FIG.15 FIG.16

WHEEL BASE, TRACKING AND FRAME ANALYZER

BACKGROUND OF THE INVENTION

Modern designs of land vehicles chassis have undergone so many changes that a reference to a "frame" is no longer meaningful. In many instances the old, side-rail, cross-member, front and rear axle construction is no longer used. Uni-body construction, where the "floor pan" of the body becomes the wheel controlling platform is one example. Four wheel independent suspension (i.e., no axles) is another example, and front wheel drives, where the driving mechanism is encased within the cross-member, makes it virtually impossible to obtain reference points on the front "axle".

"Wide track" tread width on one pair of wheels and cases where one frame side rail is "offset" at the rear to make room for the engine, further complicates the matter.

Reducing the problem to basics, one major fact evolves. Regardless of the existence or absence of a "frame", front or rear axle, front or rear drive, standard or "wide track" — the various wheel control (i.e., as to relationship) materials are formed, cast, or forged to ultimately obtain the proper wheel position (i.e., not the alignment of two opposing wheels, but the plane position of four wheels). This is separate and apart from camber, caster and toe.

With the appearance of the "wide track" vehicle, the term "tracking" is no longer meaningful (i.e., the term originally posed the question, "do the rear wheels follow in the tracks of the front wheels?"). Obviously, the "wide track" on one pair of wheels prohibits "tracking".

A more descriptive term might be "parallel test" as this, is reality, is what must be tested (i.e., the parallel relationship of the four wheels in the horizontal plane, plus their vertical contact point on the road while the front wheels are "squared" to a line drawn transversely through their steering axes). This position is automatic when setting toe with applicant's wheel aligner, described in U.S. Pat. No. 3,455,936.

SUMMARY OF THE INVENTION

A principal object of the present invention is to furnish an economical instrument which will quickly and accurately determine the geographical position and relationship of four vehicle wheels from a position alongside the vehicle.

A second object of the invention is to improve the accuracy of such instruments by enabling the individual gauges to be placed in the front, or at the rear of the same wheels to prevent misreadings which might occur due to a small tire on one side throwing a particular test gauge out of alignment.

A third object is to provide a gauge which will accurately determine such frame distortions as diamond frame, offset frame, slipped rear axle, and a crushed front corner.

The detailed structure of the invention is briefly described in the Abstract.

DESCRIPTION OF THE DRAWINGS

In order that all of the structural features for attaining the objects of this invention may be readily understood, reference is made to the accompanying drawings wherein:

FIG. 14 is a plan view of a fragmentary portion of a second embodiment of the frame analyzer of this invention in which a protractor type scale and an elastic cord has been substituted for each sight tube of the first embodiment shown in the prior figures;

FIG. 15 is an elevation view of that portion of one of the gauges showing the support frame locating the origin point of a protractor scale over unity ratio markings on the reverse scales;

FIG. 16 is a section view taken along line 16—16 of FIG. 15;

DESCRIPTION OF THE PREFERRED EMBODIMENT

Figure 1:
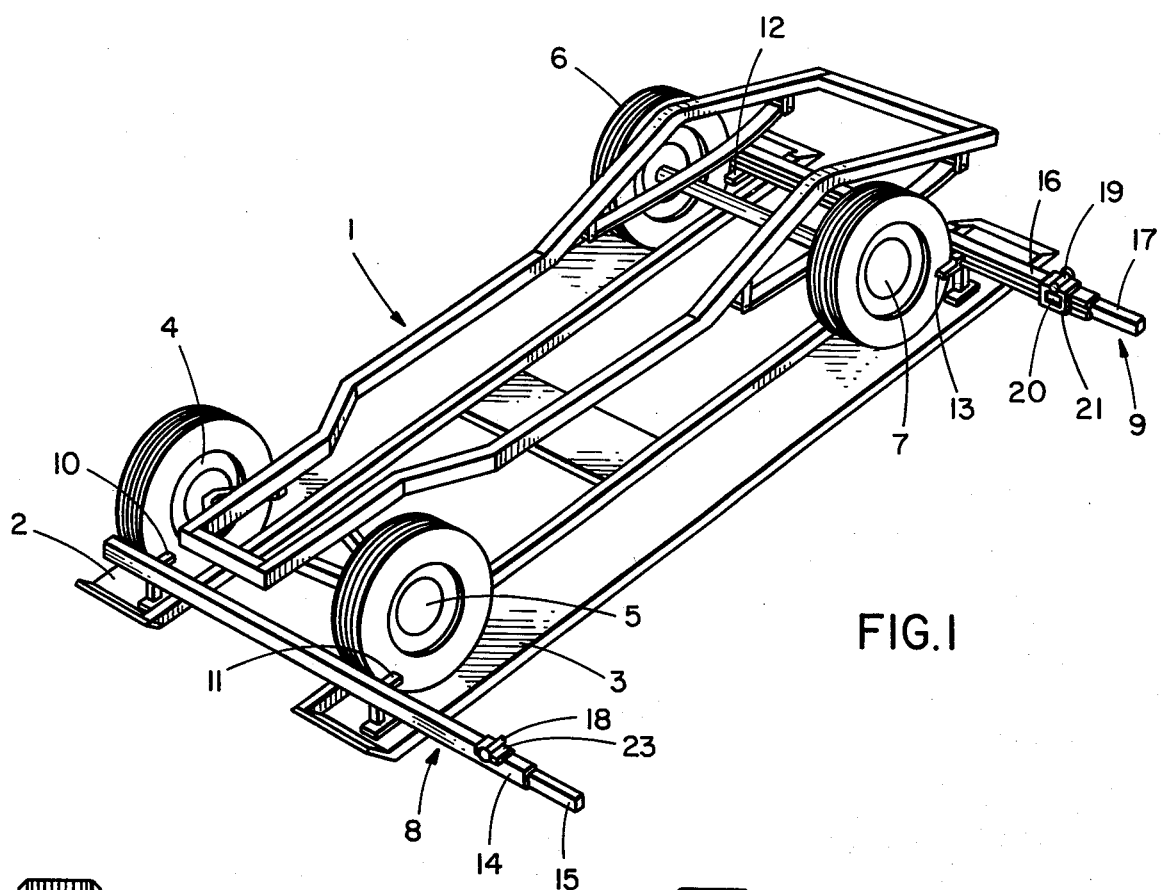
FIG. 1 is a perspective view of the frame analyzer of the invention comprising two telescoping gauges applied to the front and rear wheels of a vehicle frame.

Referring to FIG. 1, a vehicle frame 1 is shown supported on a pair of lift rails 2 and 3 by a set of wheels 4,5,6 and 7. Each of wheels 4–7 carry conventional vehicle tires which are supported on lift rails 2 and 3.

The wheel base, tracking and frame analyzer of this invention (hereafter termed frame analyzer) comprises two gauges 8 and 9. Gauge 8 is shown supported on lift rails 2 and 3, and contact fingers 10 and 11 of gauge 8 contact and are aligned by the adjacent sidewalls of the tires of wheels 4 and 5, respectively. Similarly, gauge 9 is shown applied to wheels 6 and 7. Contact fingers 12 and 13 are shown applied to the sidewalls of the tires supported by wheels 6 and 7.

As is hereafter outlined in detail, each of gauges 8 and 9 comprises a pair of telescoping channels, such as channels 14 and 15 of gauge 8 and channels 16 and 17 of gauge 9.

Gauge 8 carries a sight tube 18 and gauge 9 carries a sight tube 19. Sight tube 18 reads the relative numerical settings of a pair of reverse scales mounted on channels 16 and 17 of gauge 9. The precise reading is outlined by window 20 located within sight tube support frame 21. Similarly, sight tube 19 reads the relative reading of a pair of reverse scales located on channels 14 and 15 of gauge 8, outlined within window 22 (FIG. 5) of sight tube support frame 23. As is best shown in FIGS. 4–8, channels 14 and 15 are generally of a U-shape construction with channel 15 being enveloped by channel 14 so that a telescoping combination can be formed.

The corresponding channels 16 and 17 of gauge 9 also have a similar construction so that these channels can telescope relative one another.

Figure 7:
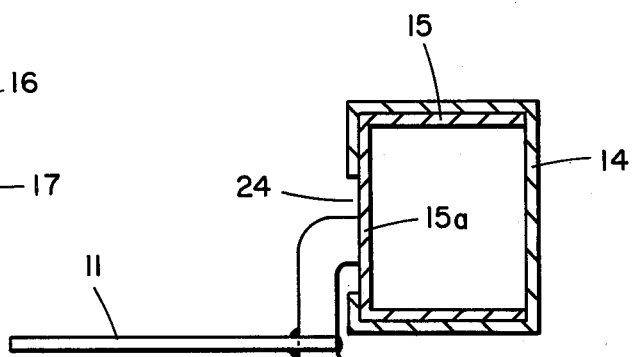
FIG. 7 is a section view taken along line 7—7 of FIG. 3 showing the support leg and gauge alignment finger for the inner channel of a gauge.

Channel 14 is formed with an opening or elongated slot 24 as is shown in FIG. 7, slot 24 enables an irregular shaped leg 25 to be attached to base section 15a of channel 15. Leg 25 carries a support foot 26 which rests on lift rail 3 or in other applications on the floor.

Support leg 25 also carries contact alignment finger 11. In particular, contact finger 11 is welded rigidly to leg 25 so that the finger projects at a right angle from the adjacent base sections of channels 14 and 15.

Figure 8:
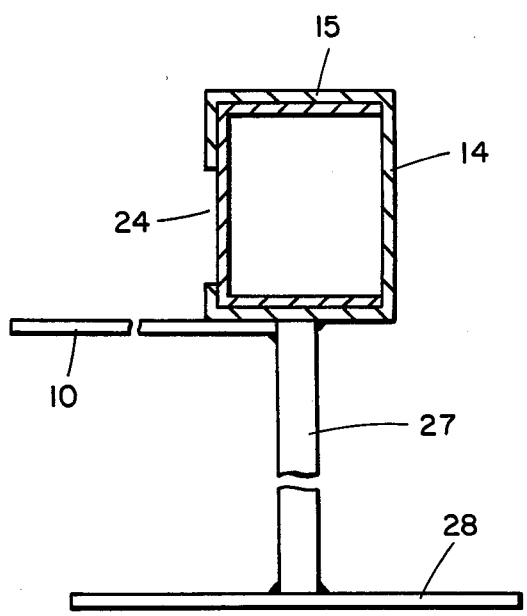
FIG. 8 is a section view taken along the line 8—8 of FIG. 3 showing the support leg and gauge alignment finger for the outer channel of a gauge.

As is shown in FIG. 8, channel 14 of gauge 8 is supported by leg 27 which carries a support foot 28. Leg 27 also carries contact alignment finger 10. In particular, contact finger 10 is welded to support leg 27. The longitudinal axis of support finger 10 is parallel to the longitudinal axis of support finger 11, and the axis of each finger is normal to the longitudinal axis of gauge 8 as formed by telescoping channels 14 and 15.

As is shown in FIG. 1, gauge 9 is also supported by a pair of legs and feet which correspond in construction and function to components 25–28.

Figure 2:
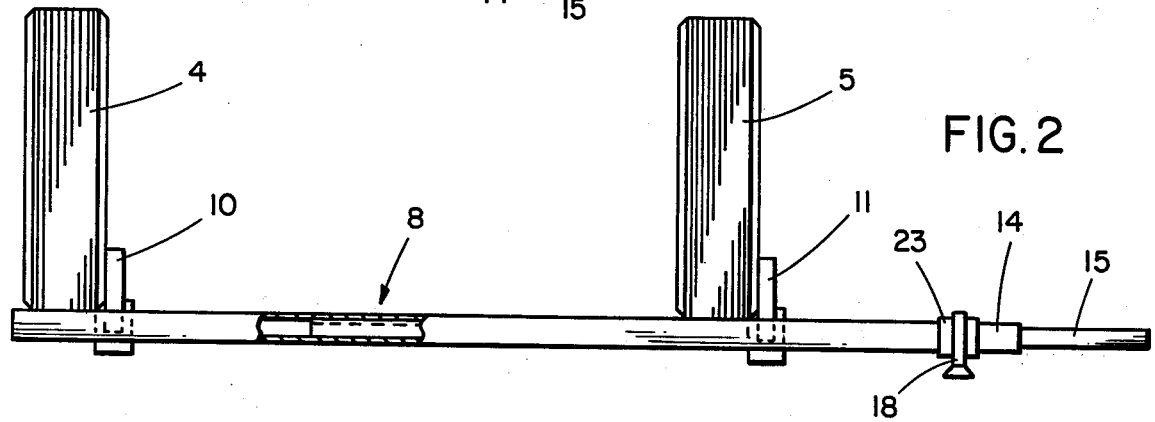
FIG. 2 is a plan view of a single telescoping gauge applied to a set of wheels.
Figure 3:
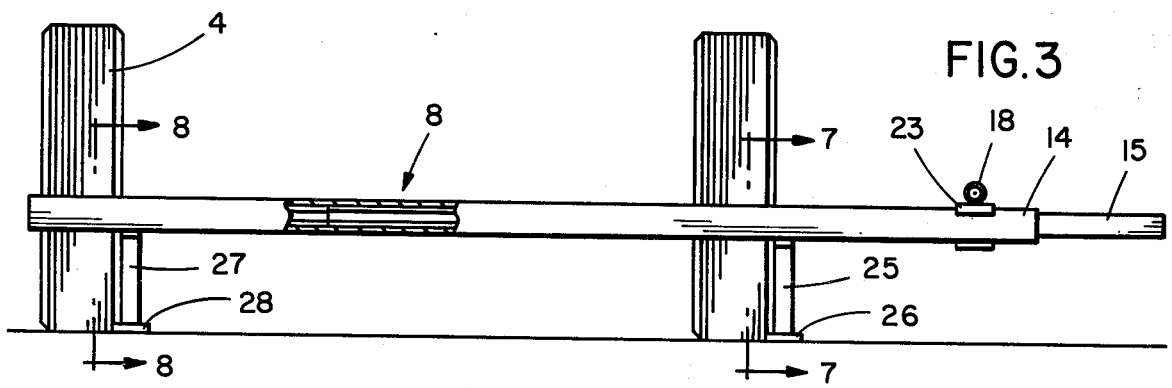
FIG. 3 is an elevation view of the structure of FIG. 1.

In the disposition of both gauges 8 and 9 with respect to a set of vehicle wheels, it is necessary that gauge channels 14, 15 with respect to gauge 8, and gauge channels 16, 17 with respect to gauge 9, be appropriately telescoped so that the faces of the channels and the contact fingers rest squarely against the tire surfaces, as is shown in FIGS. 1 and 2, for example.

Figure 4:
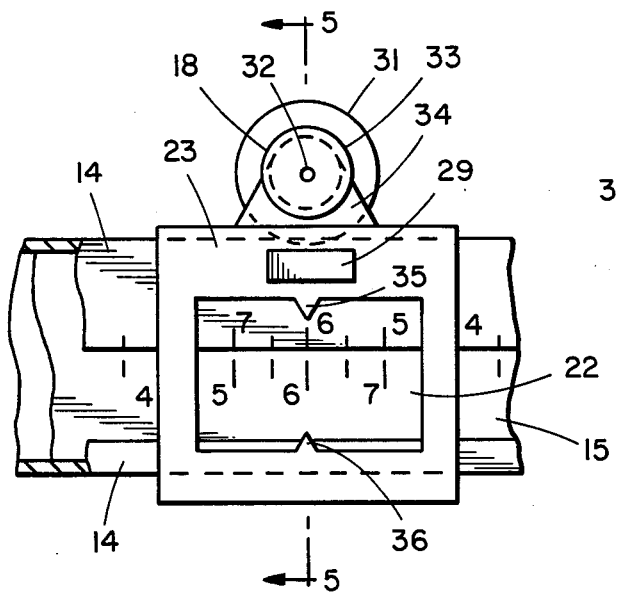
FIG. 4 is a fragmentary enlarged view of the gauge of FIGS. 1 and 2, showing the reverse scales on a set of telescoping gauge elements and the frame supporting a sight tube.
Figure 5:
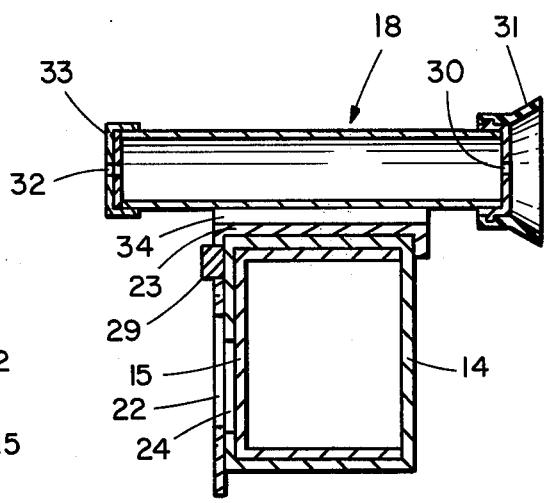
FIG. 5 is a section view taken along line 5—5 of FIG. 4 which shows the details of the sight tube and sight tube support frame as carried on a gauge.

As is shown in FIG. 4, each of channels 14 and 15 of gauge 8 (and the same is also true of the corresponding channels 16 and 17 of gauge 9) carry a set of scales ranging typically from 0–12 inches. In the case of channel 14, the scale starts from right to left and in the case of channel 15, the scale starts from left to right and accordingly a set of reverse scales are formed by the telescoping channels which assume different positions, depending upon the spread between fingers 10 and 11 as defined by the tread width of wheels 4 and 5, for example.

In general, and with reference to FIG. 1, the portion of gauges 8 and 9 that carry the reverse scales are those portions of the telescoping bars 14 and 15 which are generally to the right of wheels 5 and 7. From an analytical aspect, all that is required is that the scales of the outside channels, namely, channels 14 and 16, start at the same distance with respect to their corresponding contact fingers 10 and 12. In a similar fashion, inside channels 15 and 17 should start at the same distance with respect to their contact fingers 11 and 13. In adhering to the foregoing disposition of the scales, it is necessary, however, that an overlap of the scales generally be provided for the tread widths normal to the vehicles whose frames are to be analyzed.

Sight tubes 18 and 19 are identical in construction, and each of these sight tubes is supported with respect to its gauge 8 or 9, as the case may be, by a generally L-shaped sight tube support frame 23 (FIGS, 4 and 5 with respect to sight tube 18). Each of the sight tube support frames, such as frame 23, is slidable relative its contacted channel 14; and each of the support frames carries a bar magnet, such as bar magnet 29 lodged within an opening in support frame 23. In view of the fact that channel 14 is fabricated of magnetic material, magnet 29 is capable of holding support frame 23 and the supported sight tube 18 in a fixed position relative gauge 8.

Support frame 23 carries sight tube 18 so that the line of sight provided by aperture 30 of eye piece 31 and aperture 32 of end cap 33 is normal to the longitudinal axis of gauge 8, for example. Sight tube 18 is fixed to support frame 23 by bracket 34.

A rectangular window or opening 22 is formed in the vertical flange of support frame 23. A pair of scale markers 35 and 36 which are vertically disposed with respect to one another provide means for reading the relative disposition of the reverse scales located on channels 14 and 15. In FIG. 4, scale markers 35 and 36 give a reading of 6 inches, for example, on both scales and in the operation of the frame analyzer, this reading is observed by sight tube 19 located on the opposing gauge 9 (FIG. 1).

Figure 6:
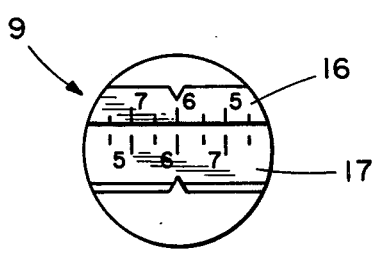
FIG. 6 is a view showing the reverse scales of a first gauge as viewed from the sight tube carried by a second gauge.

In the event that the vehicle 1 frame to which gauges 8 and 9 are applied is without frame distortion, and the tread widths of the front wheel set and the tread width of the rear wheel set are identical, then sight tube 18 will indicate a view on bar 9 as is shown in FIG. 6; i.e., the reverse scales located on channels 16 and 17 will give an identical reading to that located on channels 14 and 15 of bar 8 when the sight tubes 18 and 19 are properly disposed relative their respective bars, as hereafter set forth.

Figure 9:
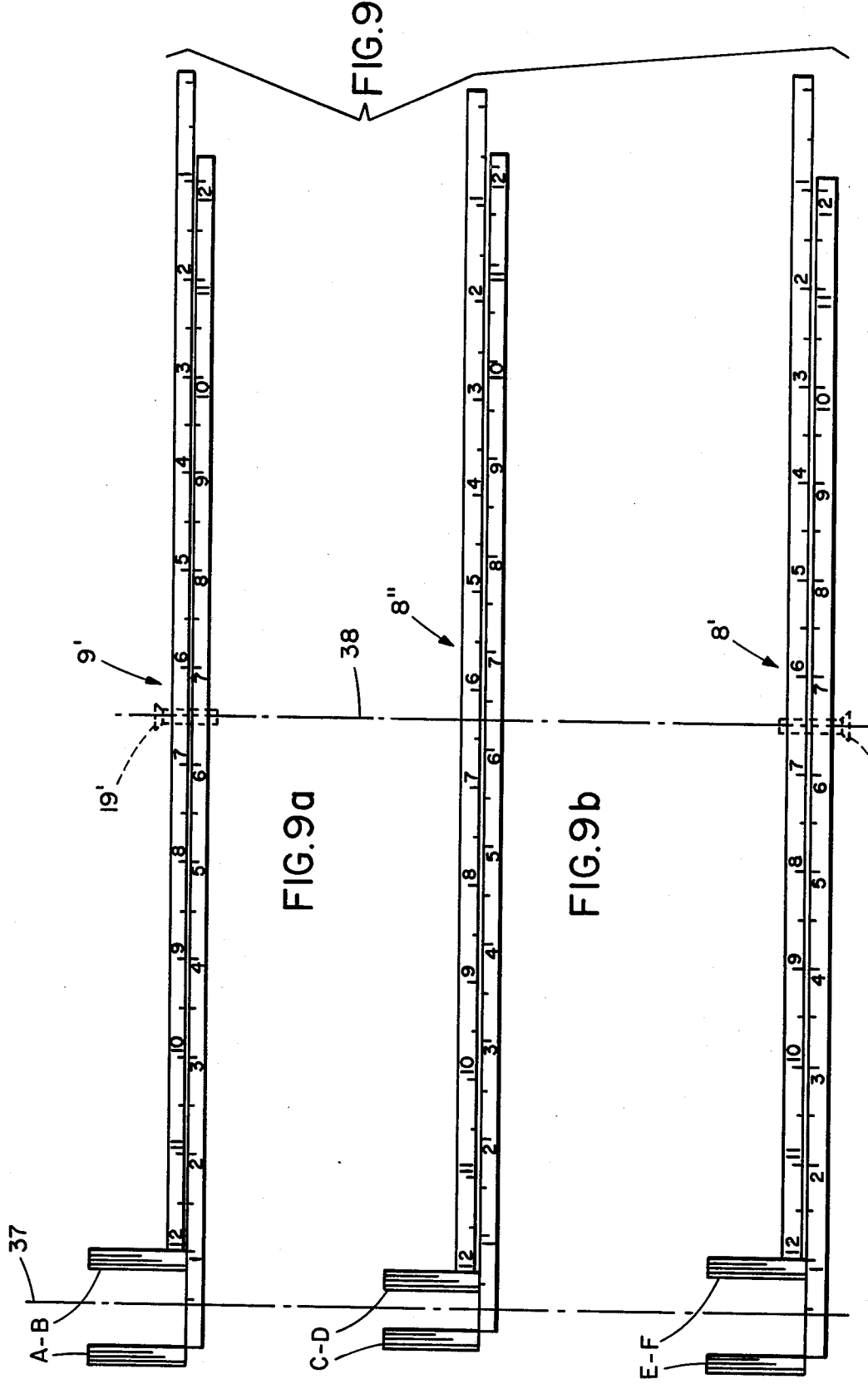
FIG. 9 (FIGS. 9a, 9b 9c) is a diagram of assistance in explaining the theory of the reverse scales of the frame analyzer of this invention.

Accordingly, referring now to FIG. 9, where three sets of wheels are shown, set AB, set CD and set EF, all having a symmetrical relationship with the steering axis 37. The wheel sets thus represent wheels supported on the non-distorted frame or chassis. In the operation of the frame analyzer of this invention, the peep sight is normally set on a first gauge such as gauge 8 or 9, at a point at which indicia or scale markers 35 and 36 (FIG. 4) read a ratio of 1. Accordingly, the sight tube attached to the telescoping gauge 9' in FIG. 9a is located with its centerline reading 6½ inches as this is the only measurement on both of the reverse scales which will give a ratio of 1. In view of the fact that the set of wheels EF shown in FIG. 9c has the same tread width as the set of wheels AB shown in FIG. 9a, and both sets are symmetrically disposed relative the steering axis 37, the sight tube 19' associated with gauge 9' will give a line of sight corresponding to line 38, and this line of sight will indicate or result in a reading on gauge 8' at 6½ inches on both of the reverse scales. Consequently the ratio of 1 read on gauge 8' by sight tube 19', and the ratio of 1 read by sight tube 18' on gauge 9', indicates that both sets of wheels AB and EF are symmetrically disposed with respect to steering axis 37, and that the theoretical frame or chassis supporting wheels AB and EF is free from distortion.

In the event the vehicle under test has a pair of "wide track" wheels AB and a pair of narrow track wheels CD, it is nonetheless a characteristic of the gauges of the frame analyzer of this invention that if the wheels AB and CD are symmetrically disposed with respect to the steering axis 37 and in the same plane, that a peep sight 19' located on gauge 9' (FIG. 9A) will view a set of numbers on the bars of gauge 8" that have a ratio of unity. In particular, line of sight 38 transverses the gauges of bar 8" at a point of approximately 6¼ inches on the upper bar and at an approximate equal point of 6¼ inches at the lower bar. This is a characteristic which enables the gauges 8 and 9 of this invention, employing reversing scales, to indicate the various types of frame distortions that occur due to accidents and other mishaps, or for that matter, improper factory construction.

In the theoretical discussion of FIG. 9, the scales associated with gauges 8', 9' and 9" both started their scale reading at the right edges of wheels AB, CD, EF. It is not necessary in the actual construction of a commercial gauge to start the gauge scales at the sidewalls of the wheels under measurement. The essential requirement is that the gauges have corresponding scales for corresponding channels such as channels 14 and 16 which start at a distance which is the same from the contacted tires, and that the scales located on channels 15 and 17 similarly start at a distance that is the same from the contacted sidewalls of their associated wheels. Additionally, as previously stated, the scales must preferably overlap outside of the space defined by adjacent wheels so that readings can be taken to the side of the vehicle under test.

In using the frame analyzing apparatus of this invention, the following general steps are preferably taken:

1. Obtain an equal toe reading on each front wheel of the vehicle under test by use of a conventional aligner. This step is essential as the wheels must be "square" to a line running transversely through the steering axes.

2. Place a first wheel gauge behind the rear wheels and set the scale marker associated with that sight tube so that the ratio is 1 on the reverse scales. This same step should be repeated with the second gauge at the front set of wheels so that the ratio outlined by the scale markers indicate a ratio of 1.

Figure 11:
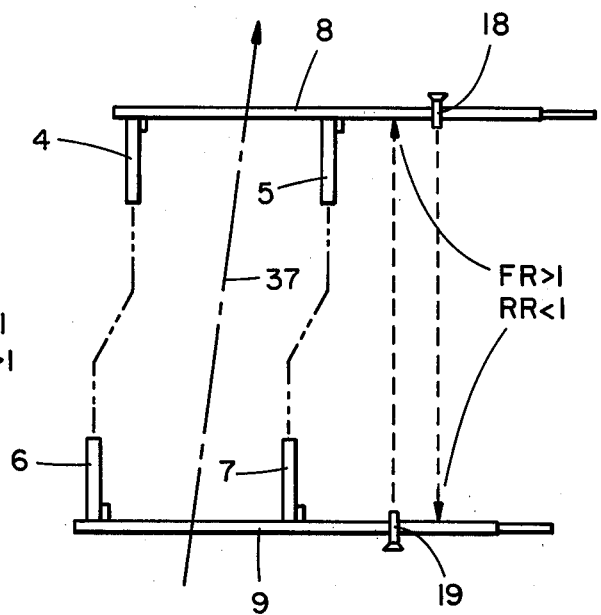
FIG. 11 is a diagram showing the application of the frame analyzer to a frame which has been distorted to an offset frame.
Figure 12:
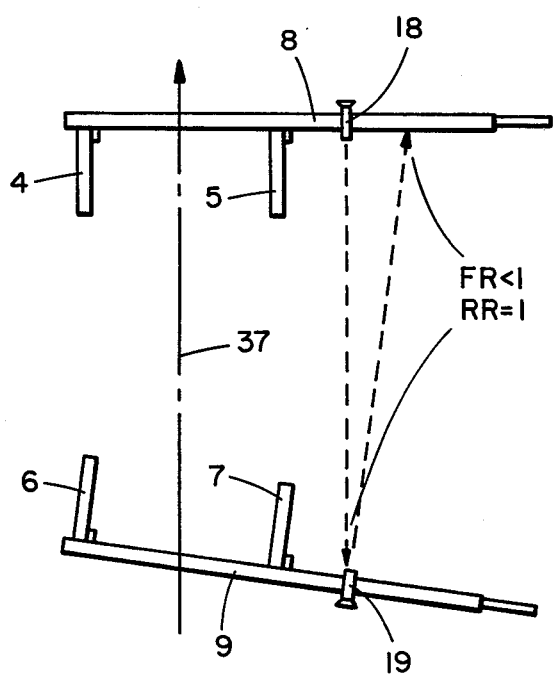
FIG. 12 is a diagram showing the application of the frame analyzer to a frame which has a slipped rear axle.
Figure 13:
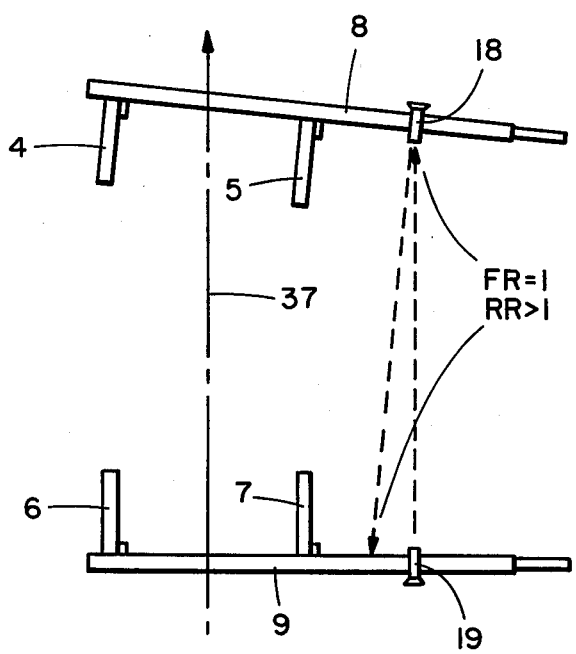
FIG. 13 is a diagram showing the application of the frame analyzer to a frame whose right front corner has been crushed.

3. A reading should be taken from each of the sight tubes against the targets indicated on the opposite gauge. If the steering axis line is parallel to the axis line of the rear wheels and front wheels, both readings will indicate substantially a unity ratio. If, however, a substantial unity ratio is not read, the possibility exists that the following types of wheel suspension distortions may exist; for example, a diamond shaped frame, such as is shown in FIG. 10, an offset frame such as indicated in FIG. 11, a slipped rear axle as is indicated in FIG. 12, and a right front corner frame crushed such as indicated in FIG. 13.

4. If there exists a question of one tire diameter variance (wear) sufficient to upset the readings, a reading can be made from both front and rear of a pair of wheels on one axle to determine a true angle which will be half-way between the two readings.

From a generic aspect, the gauges, after an understanding of the geometry and the readings provided by the geometry and scales of the gauges will indicate a substantial additional number of frame distortions. The following frame distortions represented by FIGS. 10 through 13 are merely illustrative of the type of distortions that can be detected.

Figure 10:
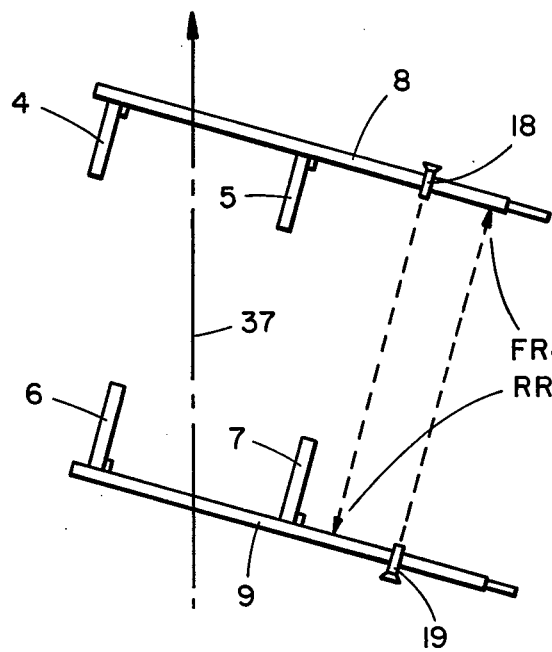
FIG. 10 is a diagram showing the application of the frame analyzer to a frame which has been distorted to a diamond frame.

In FIG. 10, the frame has been distorted so that a diamond is generally illustrated by the four wheels 4, 5, 6 and 7. In the event that both sight tubes 18 and 19 are set at a unity ratio reading on gauges 8 and 9, respectively, then the front reading read by sight tube 19 will be less than 1 and the rear reading read by sight tube 18 will be greater than 1. This particular combination of readings is indicative of a diamond frame.

Referring now to FIG. 11 wherein an offset frame is illustrated, in this particular case the front reading read by sight tube 19 is greater than 1 and the rear reading read by sight tube 18 is less than 1. It is important to note that with respect to the particular frame distortions represented by FIGS. 10 and 11, a reversal of readings has occurred when the ratios are compared to 1.

Referring to FIG. 12, a slipped rear axle frame distortion is illustrated. In this instance the front reading taken by sight tube 19 is less than 1 and the rear reading taken by sight tube 18 is equal to 1. It should again be noted that the combination of readings with the distortion of FIG. 12 differs from that of FIGS. 10 and 11.

In FIG. 13 the right front frame corner has been crushed. In this instance, the front reading taken by sight tube 19 is equal to 1, and the rear reading taken by sight tube 18 is greater than 1. It again should be noted that this particular combination of readings for the frame distortions shown in FIG. 13 differs from that of FIGS. 10, 11 and 12. The types of frame distortions that can occur are quite varied, and it would be impossible to give illustrative examples of all such distortions; however, as indicated in the typical diagrams of FIGS. 10 through 13, in all instances a different set of readings is obtained and in any event the readings will not indicate a correct ratio of 1 in any instance in which the frame has been distorted.

DESCRIPTION OF THE SECOND PREFERRED EMBODIMENT

FIGS. 14–16 show fragmentary portions of a second preferred embodiment of the frame analyzer of this invention. In this second embodiment, the principal structural change lies in substituting protractor scales 46 and 47 and elastic cord 48 for the sight tubes 18 and 19 of the first embodiment previously described.

Referring to FIG. 14, a center portion of gauges 40 and 41, which correspond generally to the same portion of gauges 8 and 9 of the first embodiment, is shown. This center portion features, on gauge 40 for example, a pair of telescoping channels 44 and 45 which carry a protractor scale 46. Protractor scale 46 is a semicircle element which projects perpendicularly from the supporting surface of protractor support frame 57 (see FIG. 16). The protractor scale is arbitrarily marked so that the center reading is zero and each quarter quadrant is marked plus or minus. In particular, the left quarter quadrant of scale 46 is plus and is cross-hatched or colored differently from the right quadrant which is not cross-hatched and carries a negative marking.

In order that quantitative ratings of frame distortions can be read, each of the scales may be subdivided into arbitrary readings of plus or minus 1, 2, 3, 4, etc.

Gauge 41 is constructed in substantially the same manner as gauge 40. Gauge 41 comprises mainly a pair of telescoping channels 42 and 43 which carry a protractor support frame 56. Protractor scale 47 projects from protractor support frame 56 in a manner similar to that of protractor scale 46. Protractor support frames 56 and 57 are slidable relative their associated channel members 43 and 44 in generally the same manner as sight tube support frames 21 and 22 are slidable upon their channels 16 and 14.

Protractor scale 47 is similarly divided into two quadrants, one of which designates a plus quadrant, and the second of which designates a negative quadrant. The plus quadrant of scale 47 is preferably colored or cross-hatched identically to that of the plus quadrant of scale 46 and similarly, the negative quadrant of scale 47 is colored in a manner similar to the negative quadrant of protractor scale 46.

Support frame 56 of gauge 41 carries a hook 49 and support frame 57 of gauge 40 carries a hook 50. Both hooks 49 and 50 are located immediately above the origin point for the respective protractor scales. Accordingly, when elastic cord 48 is extended between hooks 49 and 50, segments of the cord 48 pass over scale markings located on each protractor scale and also pass over either the zero marking or a plus or negative quadrant of each protractor scale. As hereinafter outlined, the particular combination of zero, plus or minus readings on both of the protractor scales is indicative of the type of frame distortion which may appear (or lack of such distortion) with respect to a vehicle frame to which the analyzer has been applied.

The remaining portions of gauges 40 and 41 are constructed in a manner identical to gauges 8 and 9 of the first embodiment. In particular, these gauges incorporate legs such as legs 25 and 27, and the other elements so that the gauges can be applied to a vehicle in a manner identical to that shown in FIG. 1. Additionally, each of the gauges incorporates a pair of reverse scales associated with channels 42 and 43 of gauge 41, for example, and channels 44 and 45 of gauge 40. As is shown in FIG. 15, the protractor support frame 57 is formed with a window which carries a pair of scale markers 58 and 59 which correspond to scale markers 35 and 36 of the first embodiment.

Bar magnet 52, 53, 54 and 55 hold the protractor scales to the desired adjustable position.

In the application of the gauge of the second embodiment, it is again necessary that each of the gauges be set so that a unity ratio reading is read at the reverse scales by the scale markers.

In using the frame analyzing apparatus of the second embodiment, the following general steps (which correspond in the main to the same steps of the first embodiment) are preferably taken.

1. Obtain an equal toe reading on each front wheel of the vehicle under test by use of a conventional aligner. This step is essential as the wheels must be "square" to a line running transversely to the steering axes.

2. Place a first wheel gauge behind the rear wheels and set the protractor support frame so that the scale markers associated with that gauge read a ratio of one on the reverse scales. The same step should be repeated with the second gauge at the front set of wheels so that the ratio defined by the scale markers associated with the protractor support frame also indicates a ratio of one.

Figure 18:
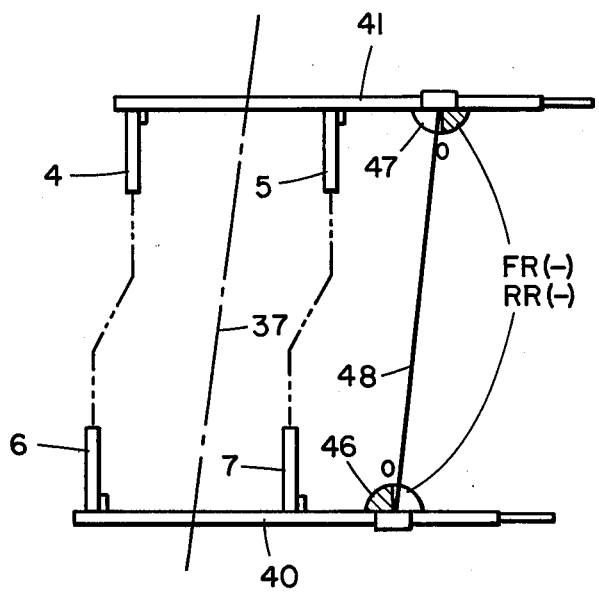
FIG. 18 is a view similar to that of FIG. 11 and showing also the application of the frame analyzer of the second embodiment to a frame which has been distorted to an offset frame.
Figure 19:
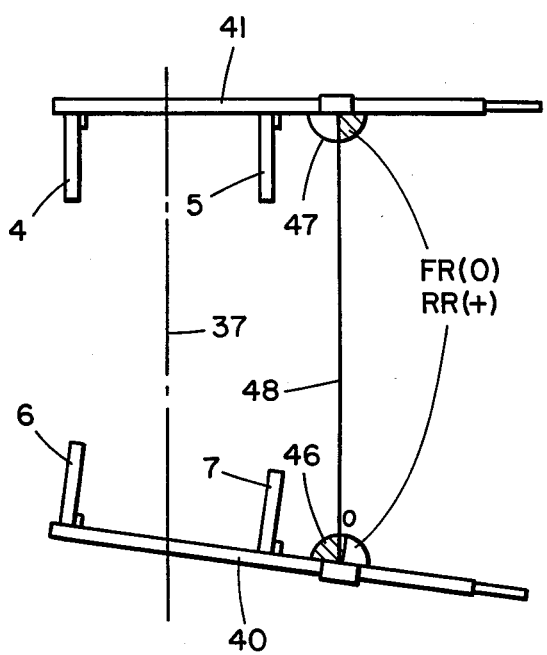
FIG. 19 is a view similar to that of FIG. 12 and showing also the application of the frame analyzer of the second embodiment to a frame which has a slipped rear axle.
Figure 20:
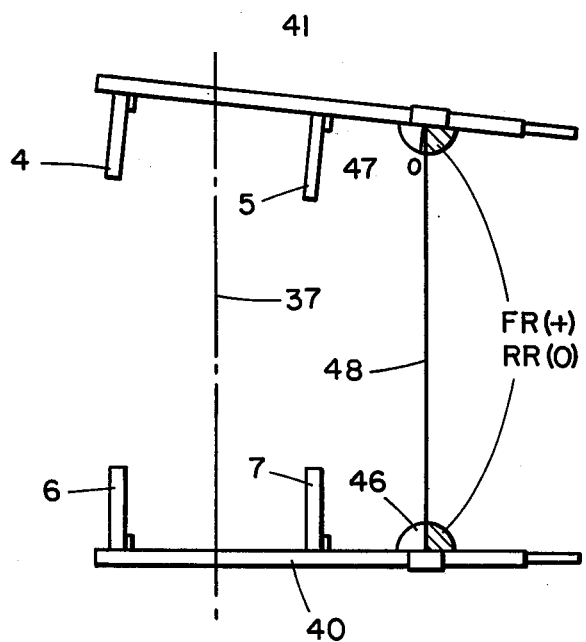
FIG. 20 is a view similar to that of FIG. 13 and showing the application of the frame analyzer of the second embodiment to a frame whose right front corner has been crushed.

3. With the elastic cord 48 extending from hooks 49 to 50, a reading should be taken from both of protractor scales 46 and 47. If the steering axis line is parallel to the axis line of the rear wheels and the front wheels, both readings will indicate substantially zero on the protractor scales. If, however, a substantial zero reading is not indicated, the possibility exists that the following types of wheels of suspension distortions may exist; for example, a diamond shaped frame such as shown in FIG. 17, an offset frame as is indicated in FIG. 18, a slipped rear axle as is indicated in FIG. 19, and a right front corner frame crushed as is indicated in FIG. 20.

4. If there exists a question of one tire diameter variance sufficient to upset the readings, a reading can be made from both front and rear of a pair of wheels on one axle to determine a true angle which will be halfway between the two readings. From a generic aspect, the gauges, after an understanding of the geometry and the readings provided by the geometry and the scales of the gauges will indicate a substantial additional number of frame distortions.

The following frame distortions represented by FIGS. 17-20 are merely illustrative of the type of distortions that can be detected.

Figure 17:
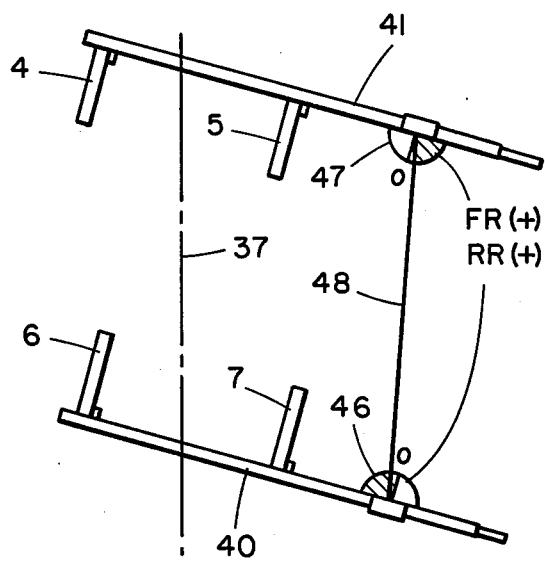
FIG. 17 is a view similar to that of FIG. 10 and showing also the application of the frame analyzer of the second embodiment to a frame which has been distorted to a diamond frame.

In FIG. 17, the frame has been distorted so that the diamond is generally illustrated by the four wheels 4, 5, 6 and 7. In the event that the reverse scales are both set at a unity ratio reading on gauges 40 and 41, respectively, then the front reading read on protractor scale 47 will be plus and the rear reading read on protractor scale 46 will be plus. This particular combination of readings is indicative of a diamond frame.

Referring now to FIG. 18 where an offset frame is illustrated, in this particular case the front reading read on protractor scale 47 is negative and the rear reading read on protractor scale 48 is also negative. This particular combination of readings is indicative of an offset frame; and it is important to note that with respect to the particular frame distortion represented by FIG. 17, a reversal of readings has occurred in the sense that both readings in FIG. 18 are negative, whereas both readings in FIG. 17 are positive.

Referring to FIG. 19, a slipped rear axle frame distortion is illustrated. In this instance the front reading taken by protractor scale 47 is zero and the rear reading taken on protractor scale 48 is plus. It should again be noted that the combination of readings with the distortion of FIG. 19 differs from that of FIGS. 17 and 18.

In FIG. 20, the right front frame corner has been crushed. In this instance, the front reading taken on protractor scale 47 is plus and the rear reading taken on protractor scale 48 is zero. It again should be noted that this particular combination of readings for the frame distortion shown in FIG. 20 differs from that of FIGS. 17, 18 and 19.

The types of frame distortions that can occur are quite varied, and it would be impossible to give illustrative examples of all such distortions; however, as indicated in the typical diagrams of FIGS. 17-20, in all instances a different combination of plus, minus and zero readings is obtained. In any event, the gauges will not indicate a zero reading on both protractor scales in any instance in which the frame has been distorted.

It should be understood that the structure described in the foregoing specification is merely illustrative of the novel features of this invention, and modifications can be made without departing from the scope of the invention.

I claim:

1. A vehicle wheel base, tracking, and frame analyzer for a four wheel and tire vehicle of the tracking type comprising a pair of gauges each having a pair of telescoping elements having tire tread engaging surfaces, a wheel tire sidewall engaging member attached to each of the telescoping elements so that each guage may be extended to tread width of a set of wheels under test, in such an extended position, each telescoping element having a portion extending outside the space between the tire engaging members on one side thereof, a pair of indicia scales carried by each gauge with one ascending scale being located on the extending portion of one of said telescoping elements in a position juxtaposed to a descending scale located on the extending portion of the other of said telescoping elements, a sight tube adjustably supported on each gauge for movement therealong outside the space between the tire engaging members adjacent the associated set of scales and positioned so that the line of sight extends perpendicularly to said gauge with the sight tube of each gauge being enabled to read the juxtaposed scales of the other gauge.

2. The combination of claim 1 in which each telescoping element defines a channel, an individual support leg fixed to each channel with the legs of each channel being accordingly separable a distance responsive to the particular degree of telescoping of each gauge.

3. The combination of claim 2 in which each wheel engaging member is a wheel or tire contact finger which is supported by each of said legs and in which the longitudinal axis of each contact finger is substantially normal to its associated gauge.

4. The combination of claim 3 in which each sight tube is supported on a support frame which includes a window carrying a scale marker to determine accurately the setting of the sight tube relative a particular reading of said pair of scales.

5. The combination of claim 4 in which each sight tube is positioned relative its scales at position when the scales read equally to take a reading on the scales of the opposite gauge.

6. The combination of claim 1 in which each sight tube is supported on a support frame which includes a window carrying a scale marker to determine accurately the setting of the sight tube relative a particular reading of said pair of scales.

7. The combination of claim 1 in which each sight tube is positioned relative its associated scales at a position when the scales read equally to take a reading on the scales of the opposite gauge.

8. A vehicle wheel base, tracking and frame analyzer for a four wheel and tire vehicle of the tracking type comprising a pair of gauges each having a pair of telescoping elements having tire tread engaging surfaces, a wheel tire sidewall engaging member attached to each of the telescoping elements so that each gauge may be extended the tread width of a set of wheels under test, in such an extended position, each telescoping element having a portion extending outside the space between the tire engaging members on one side thereof, a pair of indicia scales carried by each gauge with one ascending scale being located on the extending portion of one of said telescoping elements in a position juxtaposed to a descending scale located on the extending portion of the other of said telescoping elements, an adjustable element coupled to each gauge outside the space between the tire engaging members and movable along the longitudinal axis of the telescoping elements to identify a particular reading of the pair of scales on the associated adjustable elements, and means supported on each of said gauges comparing the relative position of the adjustable elements relative to each other when each adjustable element is positioned at a particular reading to indicate the relative alignment between the two sets of wheels.

9. The combination of claim 8 in which the comparing means comprises a protractor scale projecting from each adjustable element and a cord extending between both adjustable elements and overlying both protractor scales to enable comparison readings to be taken off each protractor scale.

10. The combination of claim 9 in which said protractor scale is a semi-circular disc divided into equal quadrants.

11. The combination of claim 8 in which the comparing means comprises a sight tube supported on each adjustable element with the sight tube of each gauge being positioned perpendicular said adjustable element to read the scale readings of the other gauge.

12. A frame analyzer for a four wheel and tire vehicle of the tracking type, comprising; a pair of gauges each having a pair of telescopic elements, a wheel engaging member attached to each of the telescopic elements adapted to extend approximately the width of each set of wheels, said elements having portions extending outside the space between the wheel engaging members, an indicia scale carried by each telescopic element with one element having ascending indicia juxtaposing descending indicia on the other element, an adjustable member slideable on one of the telescopic elements of each gauge and movable to a position outside the space between the wheel engaging members, and means supported on each of said adjustable members for comparing the relative position of the adjustable members relative to each other when each adjustable member is positioned at a particular reading of said indicia to indicate the relative alignment between the two sets of wheels.

* * * * *